United States Patent [19]
Musk

[11] Patent Number: 5,623,569
[45] Date of Patent: Apr. 22, 1997

[54] OPTICAL FIBRE TERMINATION WITH SKEWED TRANSFER FACE

[75] Inventor: Robert W. Musk, Ashbocking, United Kingdom

[73] Assignee: Hewlett-Packard Company, Palo Alto, Calif.

[21] Appl. No.: 481,446

[22] PCT Filed: Dec. 23, 1993

[86] PCT No.: PCT/GB93/02648

§ 371 Date: Jun. 20, 1995

§ 102(e) Date: Jun. 20, 1995

[87] PCT Pub. No.: WO94/15233

PCT Pub. Date: Jul. 7, 1994

[30] Foreign Application Priority Data

Dec. 29, 1992 [GB] United Kingdom .................. 9227040

[51] Int. Cl.⁶ .................................................. G02B 6/36
[52] U.S. Cl. .................................. 385/76; 385/84; 385/85
[58] Field of Search .......................... 385/58, 60, 66–69, 385/76–78, 84–86

[56] References Cited

U.S. PATENT DOCUMENTS

| | | | |
|---|---|---|---|
| 4,615,581 | 10/1986 | Morimoto | 385/60 |
| 4,695,126 | 9/1987 | Cook | 385/58 |
| 4,787,698 | 11/1988 | Lyons et al. | 385/78 |
| 4,802,726 | 2/1989 | Palmquist et al. | 385/85 |
| 5,062,682 | 11/1991 | Marazzi | 385/85 |
| 5,074,638 | 12/1991 | Poli et al. | 385/60 X |

FOREIGN PATENT DOCUMENTS 0306233  3/1989  European Pat. Off. ............... 385/85

*Primary Examiner*—John D. Lee
*Attorney, Agent, or Firm*—Nixon & Vanderhye P.C.

[57] ABSTRACT

An optical fibre termination which reduces the effect of reflections from the transfer face. The transfer face is skewed to the axis of the termination so that reflections are not propagated along the external path. The transfer face is also skewed to the core direction so that refraction makes the eternal path parallel to, and preferably co-incident with, the axis.

15 Claims, 4 Drawing Sheets

OPTICAL FIBRE TERMINATION WITH SKEWED TRANSFER FACE

BACKGROUND OF THE INVENTION

1. Field of the Invention

This invention relates to fibre terminations and especially to the termination of an optical fibre comprising a filament surrounded by a protective sheath, e.g. of a plastics or rubbery material. The filament usually has a glass core for the propagation of optical signals and a glass cladding to confine the signals to the core.

2. Related Art

At its ends an optical fibre is usually associated with external devices for optical intercommunication. It has been observed that reflections from the transfer face (i.e. the face of the fibre through which optical signals must pass for linkage with an external device) often cause operating difficulties. These difficulties are exacerbated if there are also reflections from the external device. Reflections to a signal generator can result in oscillation whereas reflections to a receiver can cause noise.

BRIEF SUMMARY OF THE INVENTION

It is an object of this invention to reduce the effect of such reflections.

This invention is based upon the principle that skewing the transfer face directs reflections received on the external path of the termination away from said external path whereby the reflections do not reach an external device located on said path. In so far as the reflections do not reach the external device, they do not affect its operation. However, skewing the transfer face causes refraction so that the external path assumes an arbitrary orientation which makes it difficult to locate the external device for coupling with the fibre. Therefore this invention also skews the core of the fibre to the direction of the external path and this angle of skew is chosen so that diffraction restores the external path to a predetermined direction, e.g. parallel to the geometric axis of the termination. Preferably the core ends on the geometric axis so that the external path is co-incident with the axis. It is particularly suitable for the angle of skew to be in the range 1° to 20° e.g. 8° to 10°.

Conveniently, the termination includes a nose-piece which holds the end of the filament at the skew angle. The nose- piece is located in the housing of the termination. The nose-piece facilitates the assembly of the termination. In a preferred embodiment, the nose-piece has a counterbalance which causes it to tilt and adopt its angle of repose on the horizontal filament. As will be explained in greater detail below, the dimensions of the nose-piece determine the angle of repose so that the desired angle of skew is produced. After the fixing the nose-piece, e.g. by using a filler material such as a thermosetting plastics, it is convenient to cut or grind the end to establish the angle of the transfer face so as to cause the amount of refractive bending needed to orient the external path as described above.

The skewing of the core and the transfer face in accordance with the invention results in a termination which has the desirable features, e.g. the external path is parallel to and preferably co-incident with a desired axis, of a conventional termination but reflections are directed off the external path so that the effect on external devices is minimised.

BRIEF DESCRIPTION OF THE DRAWINGS

The invention will now be described by way of example with reference to the accompanying drawings in which.

DETAILED DESCRIPTION OF EXEMPLARY EMBODIMENTS

Figure 1:
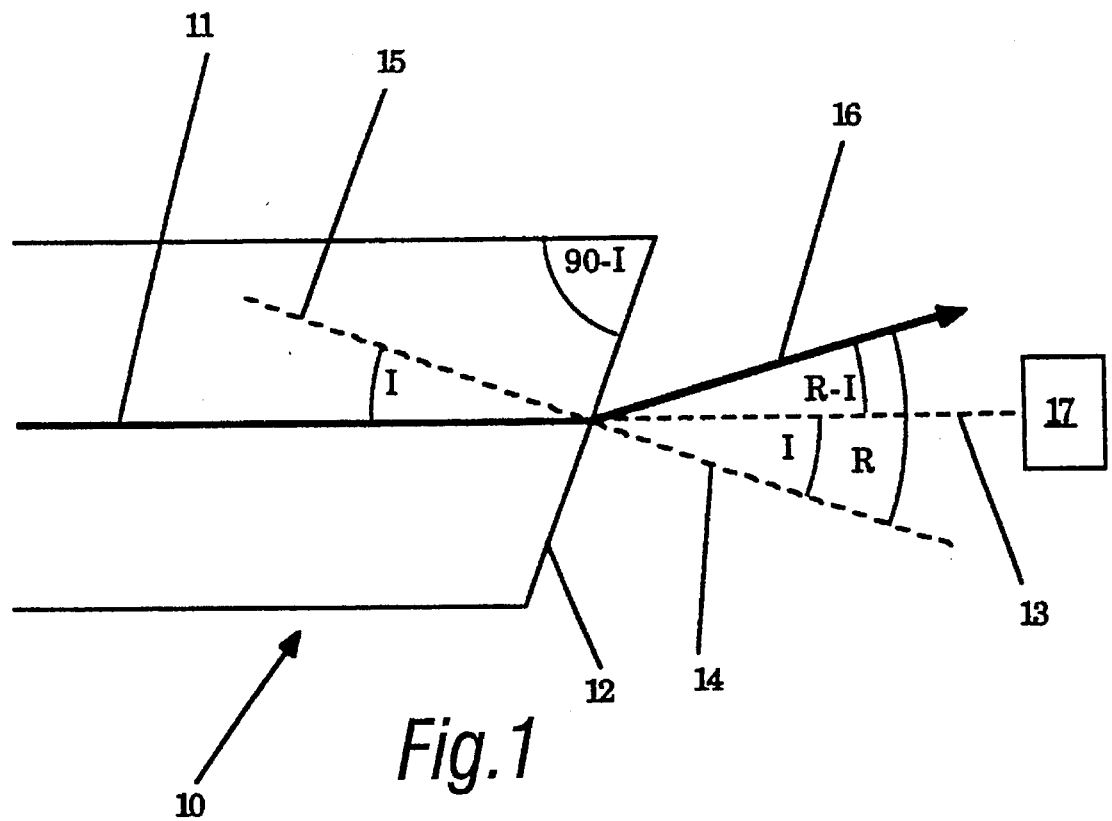
FIG. 1 is a diagram illustrating important orientations of the invention.

FIG. 1 illustrates the end portion of an optical fibre 10 which has a path region 11 and a transfer face 12. In the receive mode, optical signals exit the fibre 10 via the transfer face 12; in the transmit mode optical signals enter the fibre 10 via the transfer face 12.

In a simple configuration (not shown) the transfer face 12 is normal to the direction of the core at the end of the fibre but this simple configuration has important disadvantages. An optical signal generator would need to be placed at 17 so that light focused on the end of the fibre would be acquired for transmission. However, not all the light would be acquired; some would be reflected. Since, in the simple case, the face 12 is normal to the path of the light, the reflected light returns to the signal generator and it disturbs the operation thereof. For example, in the case of a laser the reflection is equivalent to an unwanted resonance cavity. Similar considerations apply in the case of the receive mode.

In order to reduce the effect of reflections, and in accordance with the invention, the transfer face is skewed in that it is inclined to the external path at an angle which directs the refections away from the device 17. FIG. 1 is drawn in the plane which includes the core 11 and the normal (14, 15) to the transfer face 12. "I" is the angle between the internal normal 15 and the core 11 (the core being small enough to be considered as a line). Simple geometry shows that I is also the angle between the extension 13 and the external normal 14. Because of refraction, the external path 16 is inclined to the external normal at an angle R and, by the definition of refractive index:

$$\sin R = n \sin I$$

where n is the refractive index of the core 11 relative to air. (Many fibres have cores of $GeO_2/SiO_2$ and for these fibres n is close to 1.47). Therefore. R is greater than I, and the external path 16 is above the external normal 13 as shown.

FIG. 1 shows that these values are capable of defining the important structural and optical orientations at the end of the fibre. Because the transfer face 12 is skewed as shown, reflections cause less interference than in the simple case described above.

Figure 2:
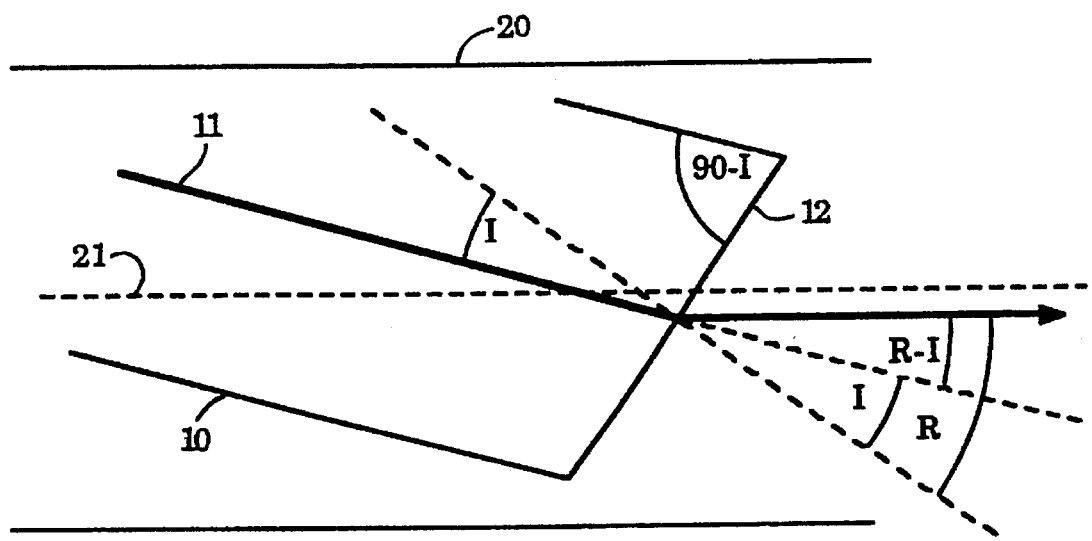
FIG. 2 illustrates in diagrammatic form further orientations at the end of a termination.

FIG. 2 illustrates, in diagrammatic form, the end of a termination which utilises the configuration of FIG. 1 but still retains the external path 16 in a convenient direction, e.g. parallel to and preferably co-incident with, the axis 21 of the termination. As shown in FIG. 2, the fibre 10 is enclosed in a tubular housing 20 but it is skewed so the core 11 is inclined to the axis 21 at an angle R–I. In the plane of FIG. 2, the transfer face 12 makes an angle (90–I) to the fibre cladding. Preferably (R–I) is in the range 1° to 20°, especially 8° to 10°.

In all important aspect, except reflection, the termination according to the invention behaves exactly as a conventional, non-skewed termination. Thus, the external path 16 is located on the axis of the termination for optimal coupling and even close examination may fail to reveal the skew which constitutes the feature of the invention. Nevertheless, the skew directs reflections so that their operational effect is substantially reduced.

Figure 3:
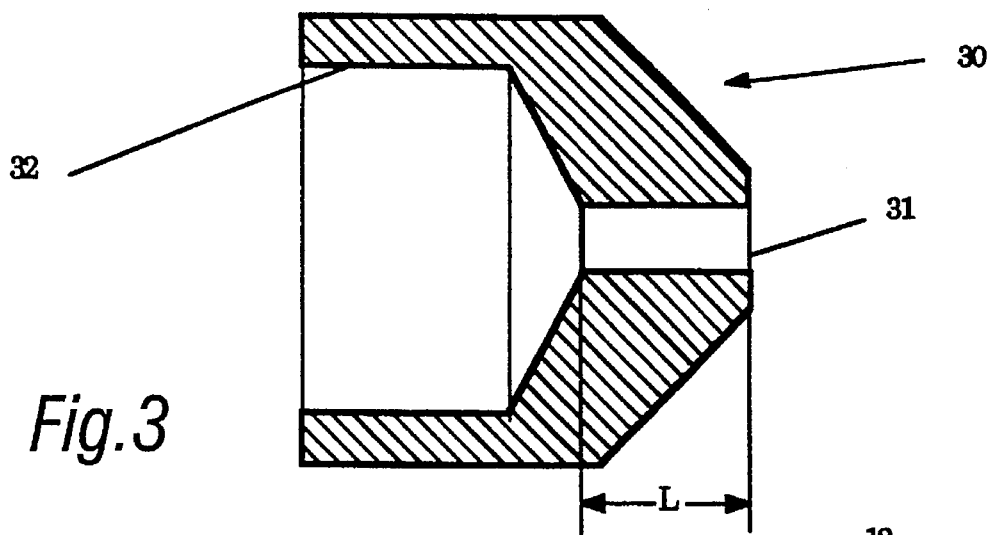
FIG. 3 is a longitudinal cross section through a nose-piece.

A method of assembling a preferred embodiment of the invention will now be described. This preferred embodiment includes a nose-piece which will be described with reference to FIG. 3

The nose-piece, generally indicated by the numeral 30, has a control tube 31 at is front and a counterbalance 32 at its rear so that the centre of mass is towards the rear. The external diameter of the counterbalance 32 provides a sliding fit into the tubular housing 20.

The length and diameter of the control tube 31 determine the angle which a fibre, located diagonally in the control tube 31, makes with the axis of the control tube 31. This feature will be explained in more detail with reference to FIGS. 4A and 4B.

Figure 4A:
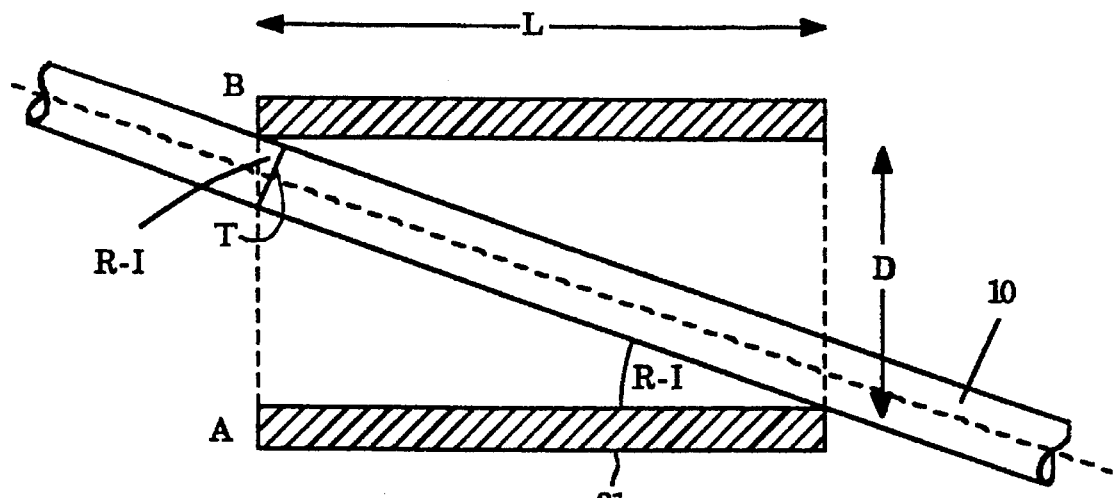
FIGS. 4A and 4B illustrate important dimensions of the nose-piece.

FIG. 4A is a cross section through the control tube 31 but only those aspects defining the dimensions are shown. In cross section the tube is rectangle having a length L and a diameter D. The fibre located diagonally in the tube has a thickness T. It is desired to arrange that the angle of the fibre is (R–I) as defined above. The thickness of the fibre is known and the length L can be selected to a convenient value, e.g. 4 mm. This enables the diameter to be calculated as:

$$D=[L \sin(R-I)+T]/[\cos(R-D)]$$

Figure 4B:
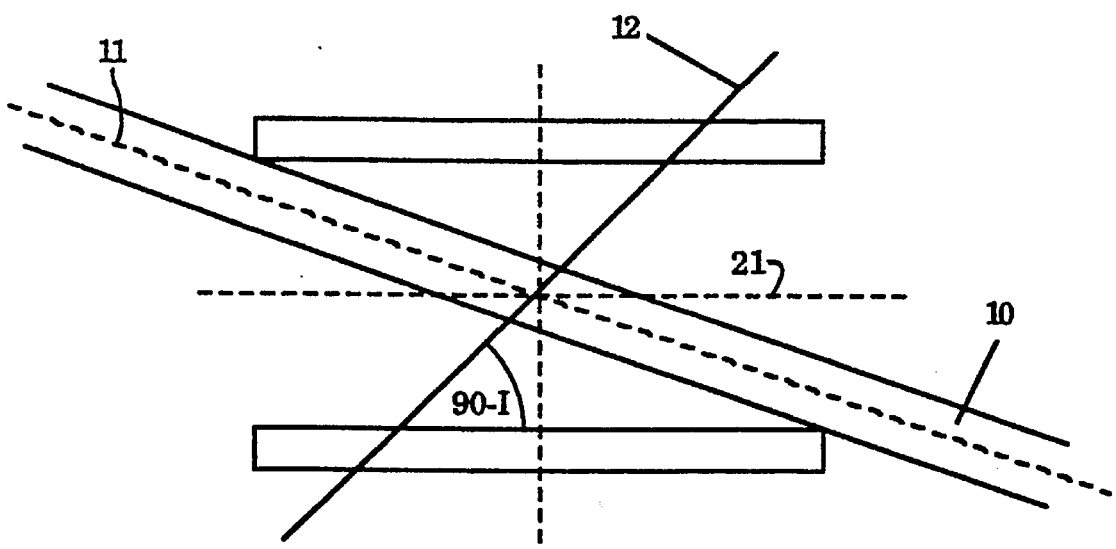

FIG. 4B is a re-drawing of FIG. 4A but without the dimensions and with axis centre-lines added. In addition, the location of the transfer face 12 is shown and it should be noted that it passes through the intersection of the two axes. FIG. 4B relates to the preferred embodiment in which the external path is co-incident with the axis 21. The orientations are important and FIG. 4B implies that the axis 21, the core 11 and the normal to the transfer face 12 are co-planar.

It is convenient to produce the configuration shown in FIG. 4B by removing material to the fight of the intended face 12 using a grinding wheel with its axis of rotation normal to the face. This means that it is necessary to mark the plane of the core 11 and the axis 21 which can be done with an index mark on the nose-piece 30. e.g. by an external flat parallel to said plane.

Figure 5A:
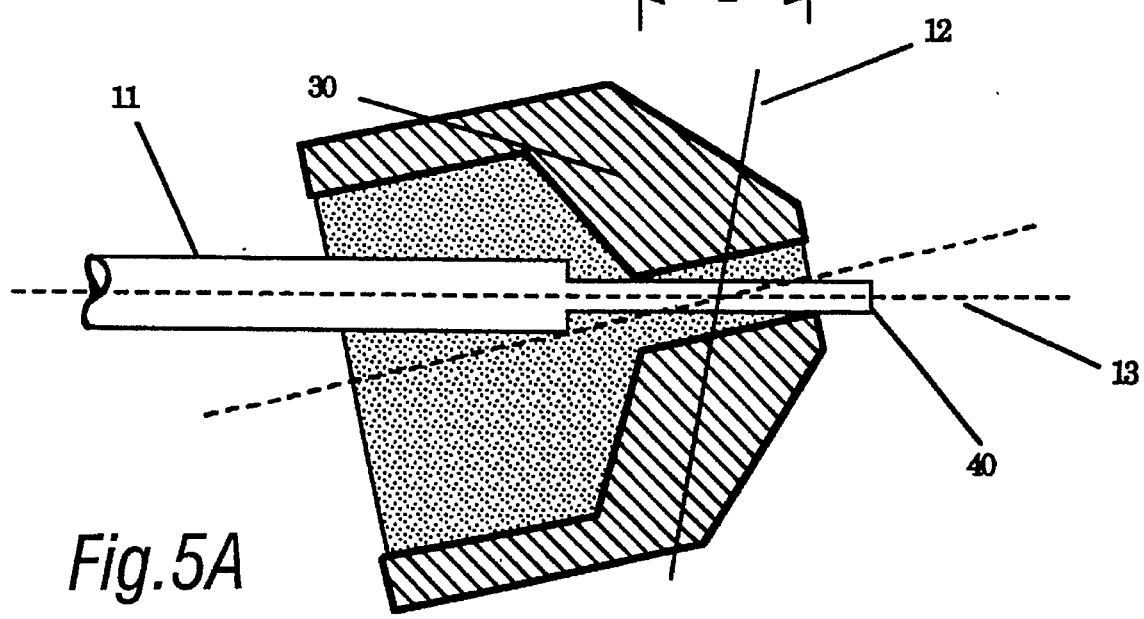
FIGS. 5A and 5B is a longitudinal cross section showing a nose-piece fixed to an optical fibre.

To assemble a termination, the fibre is prepared by removing the end portion of its plastics sheath to leave about 1 cm of bare glass filament exposed. If the other end of the fibre is not available (because the fibre is too long) the housing is placed on the fibre as a preliminary even though it is not used at the start of that assembly. As shown in FIG. 5A, the fibre 10 is clamped with its bare end 40 horizontal and the nose-piece 30 (which is too light to bend the fibre) is placed on the bare end 40. Because the centre of mass is towards the rear the nose-piece tilts to its angle of repose which means that the horizontal fibre is located as mentioned with respect to FIGS. 3, 4A and 4B. Thus the critical skew defined above is established and, at this time a thermosetting or other filler material is introduced into the nose-piece so that the configuration is finalised even when the fibre is removed from its horizontal alignment.

Figure 5B:
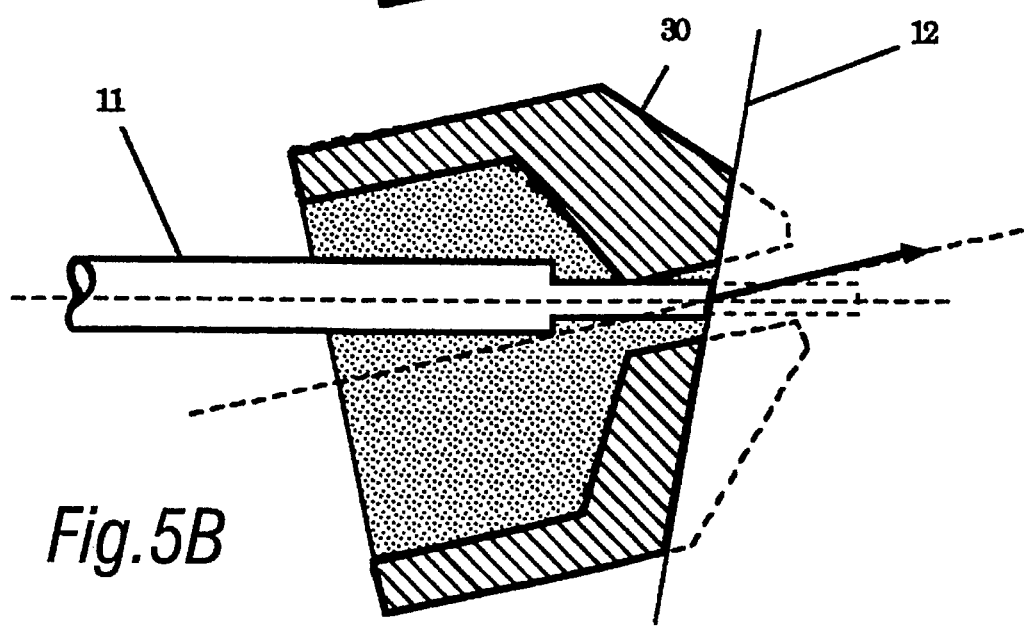

As stated with respect to FIG. 4B, the nose-piece 30 is indexed so that its orientation can be ascertained and it is presented to a grinding wheel at the correct angle to produce the transfer face 12. The control tube and the fibre located therein are ground away so that half the length is removed. That is the grinding is continued to the point where the core crosses the axis of the nose-piece so that the overall result is that the core terminates on said axis and, although the core is skewed to the axis the transfer face is skewed to the core at the compensating angle so that refraction will make the external path co-incident with the axis, as also shown in FIG. 5B.

Figure 6:
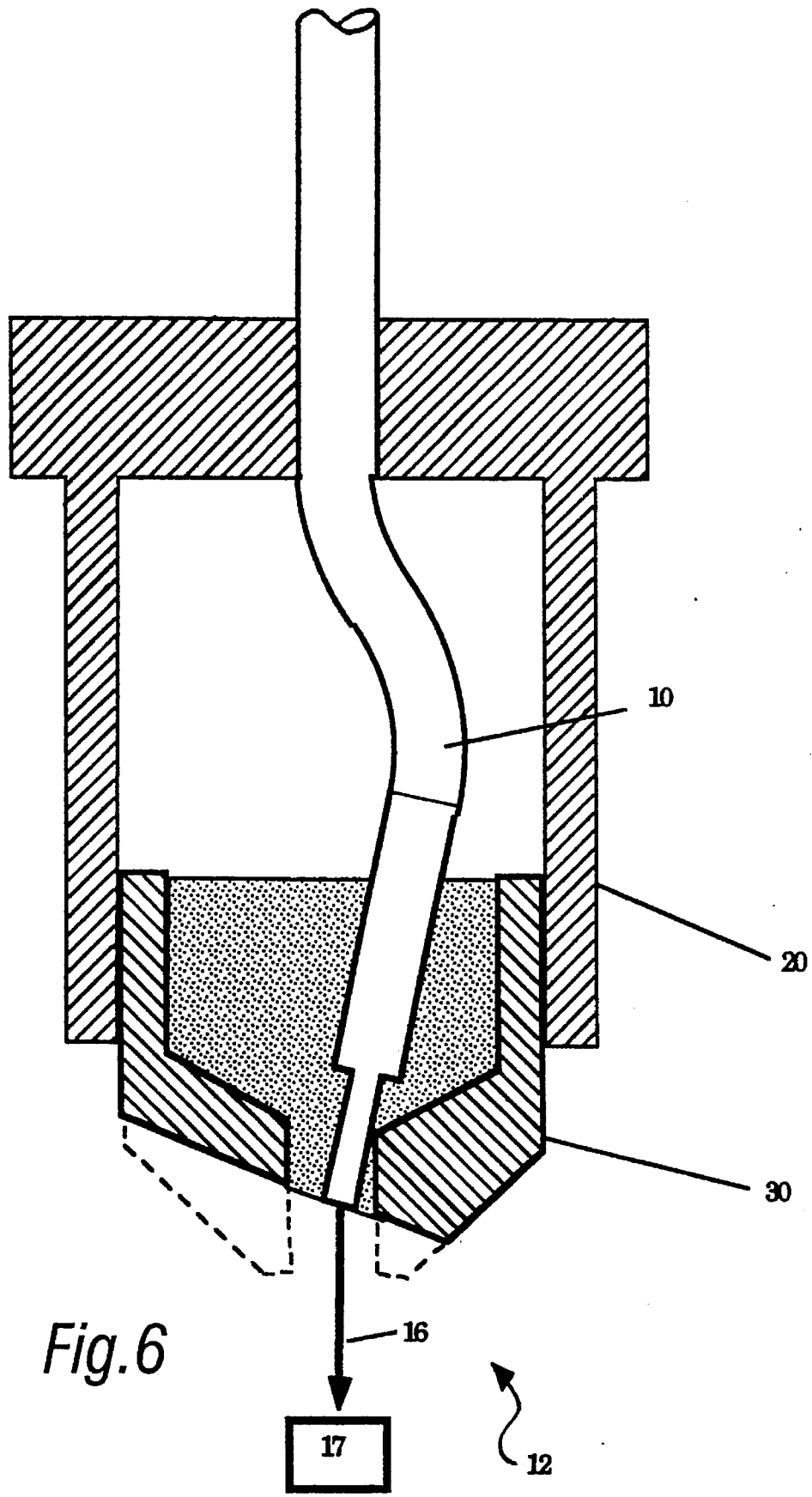
FIG. 6 is a longitudinal cross section through an assembled termination in accordance with the invention.

Finally, as shown in FIG. 6, the housing 20 (already on the fibre) is moved over the noise-piece 30. This makes the axis of the nose-pie coincide with the axis of the housing which completes the assembly of the termination. The fibre is sufficiently flexible for it to bend enough so that, although it is skewed at the end, it becomes parallel with the termination axis before it reaches the rear end.

It will be apparent that the simple technique described assembles a termination with the complicated configuration specified above giving the advantage of reducing the effect of reflections.

I claim:

1. A fibre termination comprising:

a tubular housing for protecting the end portion of an optical fibre, the optical fibre comprising a filament inside a protective sheath, the end portion of said sheath being removed to expose said filament;

the tubular housing comprising a nose-piece having a control tube substantially larger than said filament through which the exposed portion of the filament passes;

said termination providing an external optical path orientated in a predetermined direction, said fibre ending in a transfer face which provides optical connection for optical signals to pass between the core of the fibre and its external path;

wherein the direction of the core at the transfer face is skewed to both:

(a) the external path, and (b) the normal to the transfer face, the angles of skew in both (a) and (b) being matched so that refraction at the transfer face causes the external path to be oriented in said predetermined direction, and wherein the length and diameter of the control tube is such that the angle between the filament and the geometrical axis of the nose-piece is the angle defined in (a).

2. A fibre termination as in claim 1, wherein the predetermined direction is parallel to the geometric axis of the termination.

3. A fibre termination as in claim 2, wherein the core of the fibre ends on the geometric axis whereby the external path is substantially co-incident with the extension of the geometric axis.

4. A fibre termination as in claim 1, wherein the end face of the fibre is skewed at the angle specified in (b).

5. A fibre termination as in claim 1, wherein the angle specified in (a) is within the range 1° to 20°.

6. A fibre termination as in claim 5, wherein the angle is within the range 8° to 10°.

7. A method of making a fibre termination, which method comprises:

(A) removing a protective sheath from an end portion of the fibre to expose the end portion of a filament and locating said exposed portion horizontally, (B) locating a nose-piece on the exposed filament, said nose-piece including a control tube and a counterbalance such that the nose-piece adopts an angle of repose which is determined by the length and diameter of the control tube, said length and diameter being selected such that the angle between the filament and axis of the nose-piece is a predetermined angle with respect to an external path, (C) fixing the position of the nose-piece by introducing filler material into the nose-piece, (D) removing an end portion of the nose-piece and the filament contained therein to establish the transfer face at a predetermined angle with respect to a normal to the transfer face.

8. A method as in claim 7, wherein the filler material used in step (C) is a thermosetting plastic.

9. A method of making a fibre termination as in claim 7, wherein step (D) is achieved by grinding away material to produce the transfer face.

10. A method of making a fibre termination as in claim 7 which method also comprises locating and fixing the nose-piece in a housing.

11. A method of making an optical fibre termination having a predetermined angle between the fibre and a termination bore hole, said method comprising the steps of:

locating said bore hole on a straight-extending fibre and skewing the bore hole into contact with the fibre at opposite ends of the bore hole so as to define said predetermined angle between the fibre and the axis of the bore hole which angle is determined by the length and diameter of the bore hole with respect to the diameter of the fibre; and fixing the thus established predetermined angular position of the bore hole and the fibre by introducing filler material into the bore hole.

12. A method as in claim 11 further comprising the step of:

thereafter removing a portion of said bore hole, fibre and filler to establish an optical transfer face at a predetermined angle with respect to the axis of said bore hole.

13. An optical fibre termination for establishing a predetermined angle between an optical fibre axis and the termination, said termination comprising:

a control bore having a diameter larger than the diameter of said fibre, the length and diameter of the control bore determining said predetermined angle when a straight section of the optical fibre is skewed into contact with opposite ends of the control bore.

14. An optical fibre termination as in claim 13 wherein said control bore is formed in a nose-piece that fits within a coaxial housing.

15. An optical fibre termination as in claim 14 further comprising:

an optical fibre fixed in situ within the control bore by a cured filler material, said nose-piece having been ground away at an angle with respect to the axis of said control bore.

* * * * *